US008556164B1

(12) United States Patent
Freedman et al.

(10) Patent No.: US 8,556,164 B1
(45) Date of Patent: Oct. 15, 2013

(54) TRANSACTION-SPECIFIC CODES

(75) Inventors: James David Freedman, Charlotte, NC (US); Hamdija Hamid Custovic, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/524,683

(22) Filed: Jun. 15, 2012

(51) Int. Cl.
*G06F 17/40* (2006.01)
*G06Q 30/00* (2012.01)
*G06Q 90/00* (2006.01)

(52) U.S. Cl.
USPC ........... 235/375; 235/379; 235/487; 235/494; 705/14.37; 705/14.38

(58) Field of Classification Search
USPC ............... 235/375, 379, 487, 494; 705/14.37, 705/14.38
See application file for complete search history.

(56) References Cited

U.S. PATENT DOCUMENTS

| | | | |
|---|---|---|---|
| 6,997,384 B2 | 2/2006 | Hara | |
| 7,370,012 B2 | 5/2008 | Karns et al. | |
| 2003/0163388 A1* | 8/2003 | Beane | 705/26 |
| 2005/0080681 A1* | 4/2005 | Ohnishi | 705/24 |
| 2009/0070858 A1 | 3/2009 | Hiraide et al. | |
| 2009/0159661 A1* | 6/2009 | Sanches | 235/379 |
| 2009/0198617 A1 | 8/2009 | Soghoian et al. | |
| 2010/0133335 A1 | 6/2010 | Maguid et al. | |
| 2010/0174650 A1 | 7/2010 | Nonaka | |
| 2010/0299197 A1* | 11/2010 | Woodward et al. | 705/14.37 |
| 2011/0029369 A1 | 2/2011 | Taylor et al. | |
| 2011/0062231 A1 | 3/2011 | Wang | |
| 2011/0108622 A1* | 5/2011 | Das et al. | 235/380 |
| 2011/0137742 A1 | 6/2011 | Parikh | |
| 2011/0137765 A1 | 6/2011 | Nonaka | |
| 2011/0178863 A1 | 7/2011 | Daigle | |
| 2011/0249081 A1 | 10/2011 | Kay et al. | |
| 2011/0251949 A1 | 10/2011 | Kay et al. | |
| 2011/0252311 A1 | 10/2011 | Kay et al. | |
| 2011/0295742 A1* | 12/2011 | Boncyk et al. | 705/39 |
| 2011/0307318 A1* | 12/2011 | LaPorte et al. | 705/14.33 |
| 2012/0004964 A1 | 1/2012 | Satyavolu et al. | |
| 2012/0004967 A1 | 1/2012 | Satyavolu et al. | |
| 2012/0004969 A1 | 1/2012 | Satyavolu et al. | |
| 2012/0016731 A1 | 1/2012 | Smith et al. | |

(Continued)

OTHER PUBLICATIONS

Manage Mobile Payments Your Way, Today, Retailers Overview-Paydiant, Inc., from <www.paydiant.com/retailers/retailers-overview.html>, accessed May 15, 2012, 2 pages.

(Continued)

*Primary Examiner* — Seung Lee
*Assistant Examiner* — Claude J Brown
(74) *Attorney, Agent, or Firm* — Banner & Witcoff, Ltd; Michael A. Springs

(57) ABSTRACT

Codes, such as Quick Response (QR) codes, may be printed on a transaction receipt or displayed on a display unit of a workstation or self-service device (e.g., an ATM) to provide users with additional promotions or to service an error that may have occurred during the transaction. The code may be unique to the transaction and generated by the transaction device during the transaction. The code may encode information unique to the transaction, such as a unique identifier generated by the transaction device that links the code to a storage device storing additional information on the transaction. Users may scan the code to obtain additional promotion information or to contact a service agent to resolve an error.

18 Claims, 10 Drawing Sheets

(56) References Cited

U.S. PATENT DOCUMENTS

2012/0023131 A1 1/2012 Downey et al.
2012/0054046 A1 3/2012 Albisu
2012/0095819 A1 4/2012 Li

OTHER PUBLICATIONS

QR-to-Call™ Click to Dial in the Smartphone Era, Attract New Customers with a QR Code Callback Application, technovox, QR Code Callback Application, from <www.technovox.co.uk/qr-to-call>, accessed May 2, 2012, 2 pages.

QR Code Usage in Restaurants-708 Media, Aug. 27, 2011, from <www.708media.com/qrcode/qr-code-usage-in-restaurants/>, accessed Jun. 15, 2012, 9 pages.

Stephen Enfield, "Are you using QR codes on kiosk receipts?", Nov. 22, 2011, selfserviceworld.com, from www.selfserviceworld.com/blog/6931/Are-you-using-QR-codes-on-kiosk-receipts>, accessed May 2, 2012, 3 pages.

Technology changes moving through ATM industry, CGI ATM news, Mar. 15, 2012, from <cgiatm.com/atm-news/index.php/.../technology-changes-moving-through-atm-industry/>, accessed May 2, 2012, 3 pages.

\* cited by examiner

TRANSACTION-SPECIFIC CODES

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution or other entity, to provide a promotion or error code on a transaction receipt.

BACKGROUND

Customers of a financial institution such as a bank often complete financial transactions through bank tellers or self-service devices, such as automated teller machines (ATMs). After performing the transaction, customers may receive transaction receipts that summarize details of the transaction, such as the type of transaction performed (e.g., a cash withdrawal) and the amount involved (e.g., a $20 withdrawal). However, there exists a need to provide the customer with various offers or other promotions and customer service during and after the transaction.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A method, apparatus, and/or computer-readable medium may be provided to cause a computing device (e.g., a user device) to capture an image of a code (e.g., a 2D barcode) from a transaction receipt, wherein the 2D barcode includes first information uniquely identifying a transaction associated with the transaction receipt, generate, on a display of the computing device, an interface with at least one data field associated with the transaction, and transmit a message including the first information uniquely identifying the transaction associated with the transaction receipt. In some aspects, the 2D barcode may be a Quick Response (QR) code.

The computing device may determine that a user associated with the apparatus is not authenticated, and in response to determining that the user is not authenticated, generate, on the display device, a display for information associated with the transaction. The computing device may receive, from the user, a second information identifying the transaction associated with the transaction receipt, the second information different from the first information and populate the at least one data field of the interface with the second information.

The computing device may determine that a user associated with the computing device is authenticated, and in response to determining that the user is authenticated, transmit a request for additional information associated with the transaction, wherein the request includes the first information. The computing device may receive a response to the request, wherein the response includes second information identifying the transaction associated with the transaction receipt, the second information different from the first information, and populate the at least one data field of the interface with the second information.

In some aspects, transmitting the message may include transmitting a request for a promotion offering, wherein the request for the promotion offering includes the second information. In additional aspects, the second information may include at least one piece of information identifying an error type associated with the transaction. The computing device may initiate a call, wherein the call includes the information identifying the error type associated with the transaction. The first information may include a service telephone number, and initiating the call may include calling the service telephone number.

A method, apparatus, and/or computer-readable medium may be provided to cause a computing device (e.g., a self-service device and/or a server) to receive a request for a transaction, and after receiving the request for the transaction, generate a code (e.g., a 2D barcode) onto a transaction receipt, wherein the 2D barcode includes first information uniquely identifying the requested transaction. Second information uniquely identifying the requested transaction may be stored at a storage device. In some aspects, generating the 2D barcode may include printing the transaction receipt with the 2D barcode, wherein the transaction receipt identifies the requested transaction.

The computing device may determine that an error of an error type has occurred during the requested transaction, and receive an error identifier assigned to the error type, wherein the second information stored at the storage device includes the error identifier. A computing device and/or server may receive, from a user device, a call session request, wherein the call session request includes the first information. The computing device and/or server may determine, based on the call session request, that a user associated with the user device is authenticated, and in response to determining that the user is authenticated, retrieve the second information. The call session request and the second information may be forwarded to a service agent.

In some aspects, the computing device and/or server may receive, from a user device, a call session request for a call back session, wherein the call session request for the call back session includes information identifying a time slot for the call back session. The computing device and/or server may provide the second information stored at the storage device to a service agent, and during the time slot, the service agent may initiate a call to a user that requested the transaction.

In additional aspects, the computing device and/or server may determine that an error of an error type has occurred during the requested transaction, and determine a service telephone number associated with the error type, wherein the first information included in the 2D barcode includes the service telephone number. The computing device and/or server may determine that an error has occurred during the requested transaction, generate, by a display device of the computing device, an error identification interface displaying a plurality of error categories, and receive, from the user, an identification of at least one error category of the plurality of error categories.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
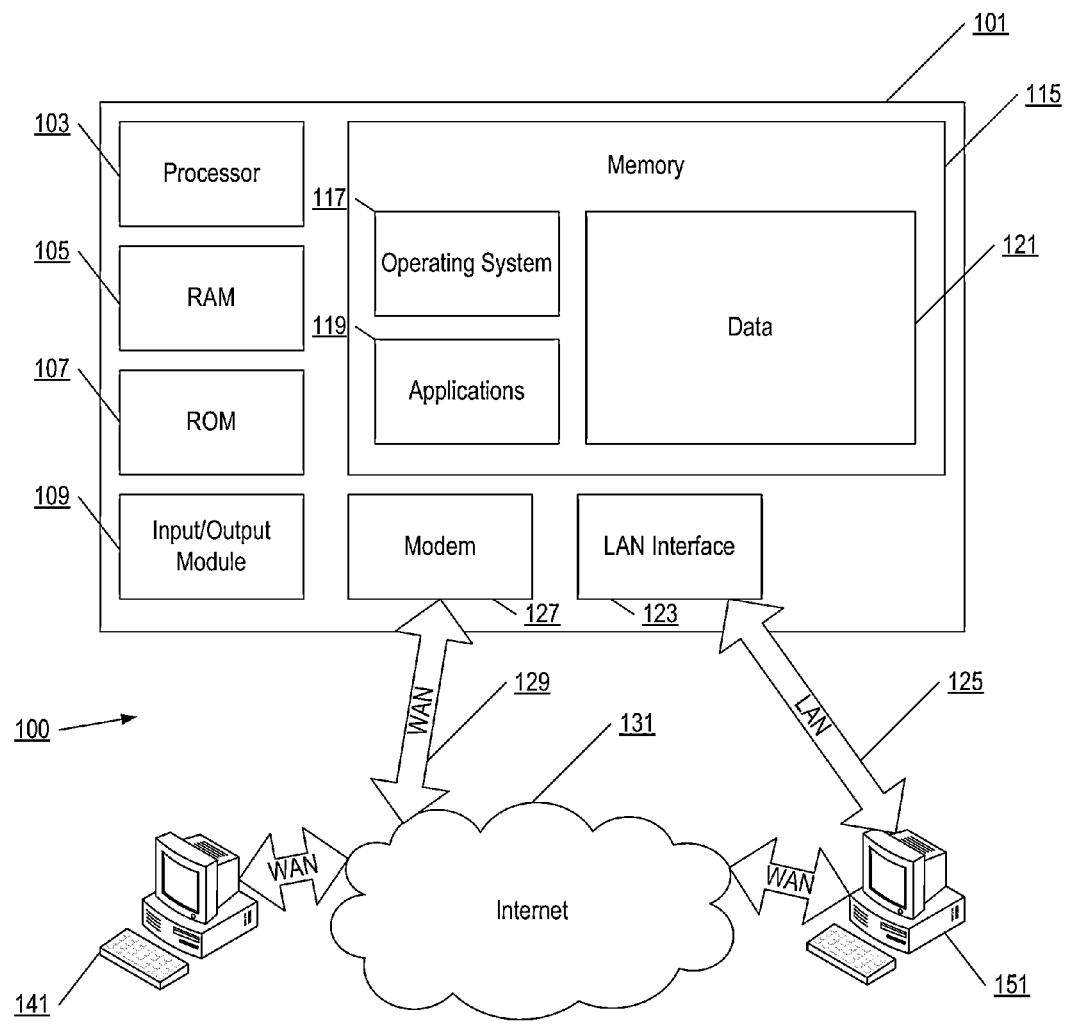
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other computing devices) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile devices (e.g., mobile phones, smartphones, PDAs, notebooks, tablets, other mobile devices) including various other components, such as a battery, speaker, and antennas.

The disclosure is operational with numerous types of general purpose or special purpose computing devices. Examples of well-known computing devices that may be suitable for use with the disclosure (including the system of FIG. 1) include, but are not limited to, desktop computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
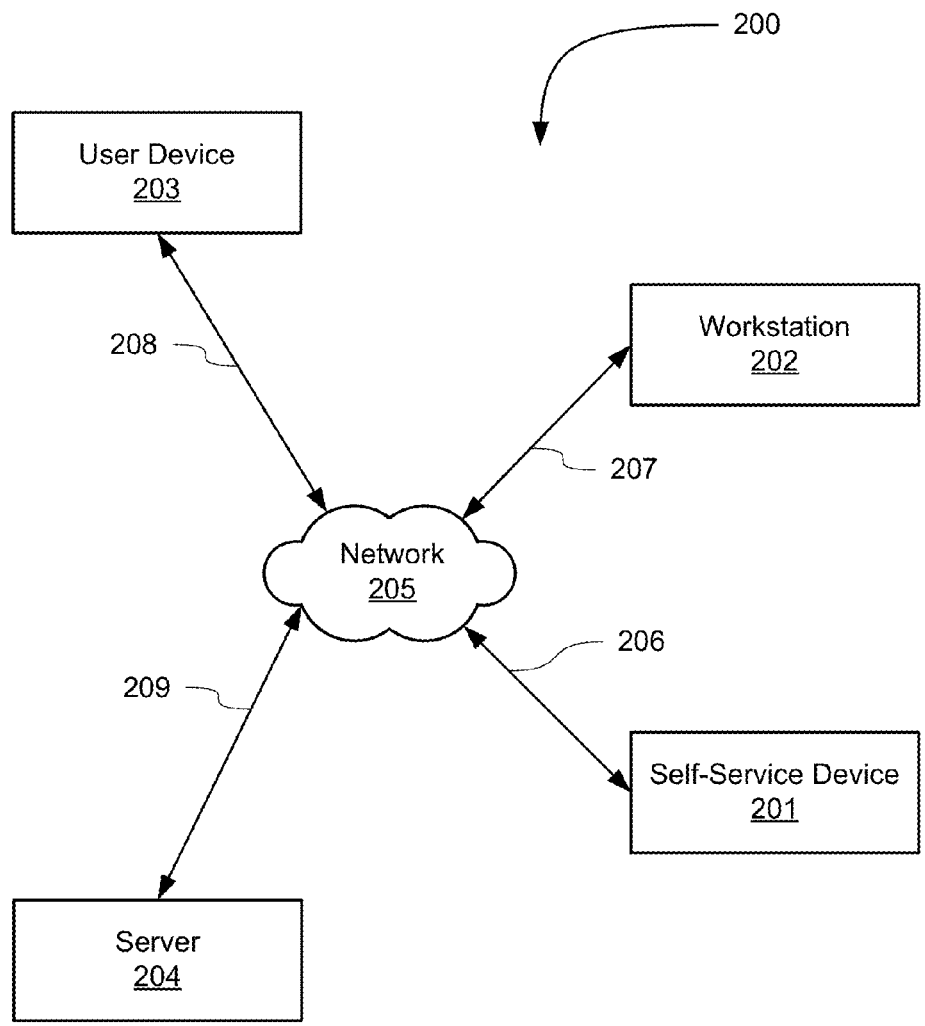
FIG. 2 illustrates another example operating environment in which various aspects of the disclosure may be implemented.

FIG. 2 illustrates an example operating environment in which various aspects of the disclosure may be implemented. An illustrative system 200 for implementing methods according to the present disclosure is shown. System 200 may include one or more self-service devices 201. A self-service device 201 may include, for example, an automated teller machine (ATM), video transaction machine (VTM), a user computing device (e.g., a personal computer, such as a laptop), a mobile device (e.g., a mobile phone, tablet), and other self-service devices. Self-service devices may facilitate transactions and/or communications among a financial institution, users (e.g., customers of the financial institution), and/or third parties (e.g., promotion providers, third-party intermediaries, other third party service and/or product providers) without relying on the services of a bank teller. Self-service devices 201 may be connected by one or more communications links 206 to a network 205.

System 200 may include one or more workstations 202. Workstations may include workstations located at financial institution facilities (e.g., a bank) and used by bank tellers to facilitate transactions requested by customers of the bank. Workstations 202 may be connected by one or more communications links 207 to network 205. System 100 may also include one or more user devices 203 (e.g., mobile devices, such as mobile phones, tablets). As will be described in further details in the examples below, user devices 203 may include various hardware and/or software components configured to capture images of offer and/or error codes from a transaction receipt (e.g., a receipt generated by a self-service device). User devices 203 may be connected by one or more communications links 208 to network 205. User devices 203 and self-service devices 201 may be the same device. For example, a mobile phone may be used as a self-service device to conduct a transaction and as a user device to receive and/or otherwise process a transaction receipt and/or a code included on the transaction receipt.

System 200 may also include one or more servers 204, which may be any suitable server, processor, computer, or data processing device, or combination of the same. Servers 204 may be owned, managed, and/or operated by a financial institution. Servers 204 may be connected by one or more communications links 209 to network 205. As will be described in further detail in the examples below, servers 204 may receive requests from users (e.g., via user devices 203) to process one or more offer and/or error code. Furthermore, servers 204 may store transaction information (e.g., time, date, type of transaction), user information (e.g., username, account number, PIN, other unique identifiers), and various other information used to process the offer and/or error code. Any of the elements in FIG. 2 may be implemented as one or more computing device, such as the example computing device 101 described in connection with FIG. 1.

Network 205 may be any suitable network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a cellular network, or any combination of any of the same. Communications links 206, 207, 208, and 209 may be any communications links suitable for communicating among self-service devices 201, workstations 202, user devices 203, and/or servers 204, such as network links, dial-up links, wireless links, hard-wired links, other communications links.

Figure 3:
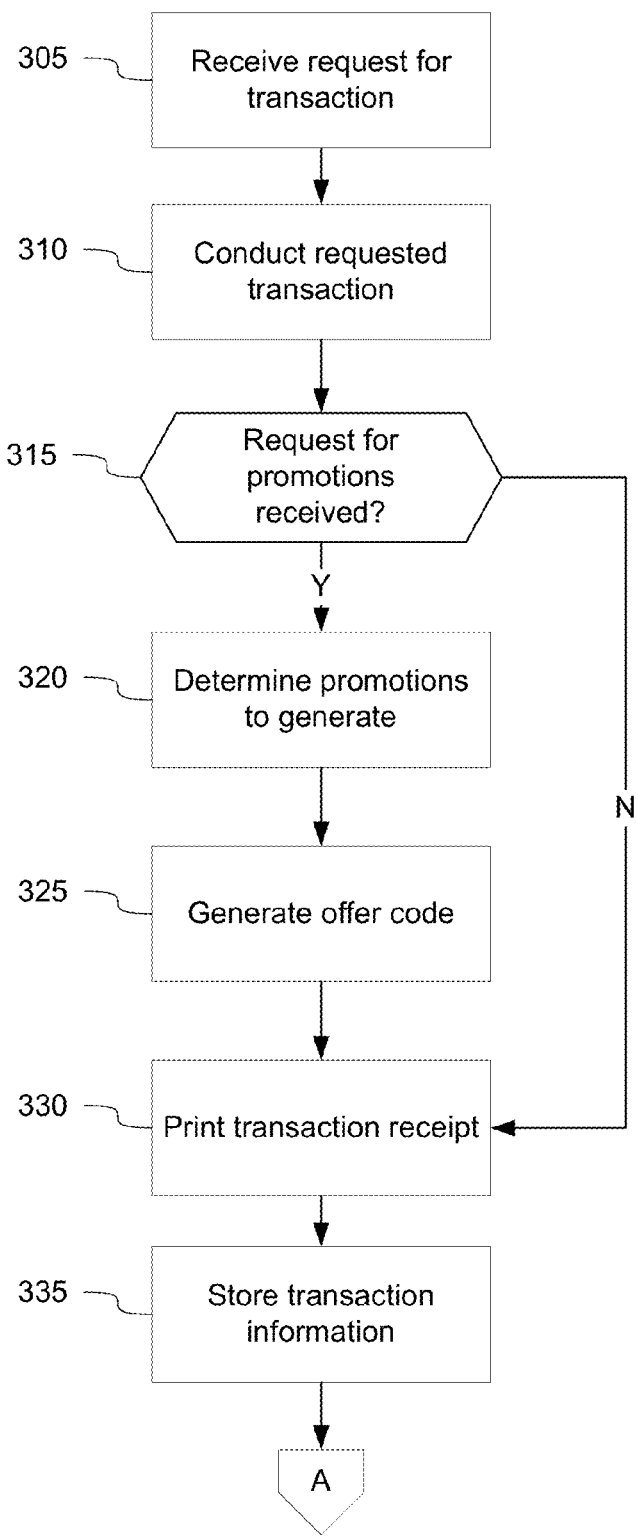
FIG. 3 illustrates an example of at least a portion of a flow diagram for generating an offer code in which various aspects of the disclosure may be implemented.

FIG. 3 illustrates an example of at least a portion of a flow diagram for generating an offer code in which various aspects of the disclosure may be implemented. The steps illustrated in FIG. 3 may be partially or fully performed by one or more computing devices, some or all of which may be owned, managed, and/or operated by a financial institution. The computing device may have a processor, memory storing computer-readable instructions to perform at least the steps illustrated in FIG. 3, and other hardware and/or software components. For example, the computing device may be, or may be part of, one of the self-service devices 201 or workstations 202 of FIG. 2. In step 305, the computing device may receive a request to perform a transaction. The request may be via direct user input to the computing device and/or via a signal provided by another device, such as over the computer network 203. Transactions may include, for example, financial transactions, such as fund deposits, fund withdrawals, check cashing, fund advances, funds transfers, payments, general account inquiries, cardless authentications, and/or account servicing, among other types of transactions.

The request may be received at a self-service device, which may be geographically distributed. For example, ATMs and VTMs may be located all over the world, including at locations convenient to the user, such as near the user's workplace, home, and/or local banking center. Personal computers may similarly be located at various locations. For example, computing workstations may be located at banking centers or within the user's home or workplace. Laptop computers, mobile phones, tablets, and/or other types of mobile devices may be carried with the user and facilitate on-the-go banking.

Self-service devices may have input devices that facilitate input of information by the user, including user information (e.g., username, account number, bank card number, unique images, such as an image of the user's face, or other information unique to the user). For example, self-service devices may have input devices such as keypads, touchscreens, wireless readers such as radio frequency (RF) scanners/readers, optical readers (e.g., barcode scanners), and/or card readers (e.g., magnetic bank card readers). A user may, for example, input an account number using the keypad or insert a bank card into the card reader to initiate a transaction. A user's personal computer or mobile device may include similar input devices. For example, the personal computer or mobile device may include touchscreen monitors, keyboards, mice (or other pointing devices), and/or cameras used to collect information from the user.

Self-service devices may have output devices for outputting information to and/or otherwise interacting with the user. For example, a self-service device may include a printer for printing transaction receipts (e.g., a paper receipt). The self-service device may also have a display device, such as a monitor to display an image of the transaction receipt (e.g., a digital receipt). The display device may also act as an input device where, for example, the display device includes a touch-sensitive display. For example, the transaction receipt may be displayed on the display device, and the self-service device may prompt the user to indicate whether the user would like to print a copy of the transaction receipt. The printer may print the receipt if requested by the user. Alternatively, the receipt for a transaction may be printed automatically without being requested by the user. In some examples, the self-service devices may have built-in printers, and personal computers and mobile devices may have external printers connected (wired or wirelessly) to them. Self-service devices may also have network interfaces for communicating with network 205 and/or various devices via communications links 206. Various types of information may be displayed on transaction receipts, including an indication of the requested transaction and various offer and/or error codes, as will be described in further detail in the examples below.

Transaction requests may also be received through other transaction channels, such as by a bank teller's workstation 202 at a banking center. Workstations may have similar input and output functionalities as self-service devices. For example, workstations may include an integrated and/or external printing device for printing transaction receipts and/or a display device for displaying an image of the transaction receipt.

In step 310, the computing device may conduct the requested transaction. As previously described, examples of transactions include, but are not limited to, financial transactions, such as fund deposits, fund withdrawals, check cashing, fund advances, funds transfers, payments, general account inquiries, cardless authentications, and/or account servicing. For example, the user may request to deposit a check at the computing device (e.g., an ATM). The computing device may conduct the requested transaction by interacting with the user (e.g., generating various displayed information for the user and/or requesting additional information from the user, such as the check amount, which account to deposit the check to), interacting with the financial institution (e.g., various servers owned/operated/managed by the financial institution) to authenticate the user and/or retrieve user account information, and/or interacting with various third parties (e.g., third parties providing offers or promotions, third party intermediaries used to facilitate the transaction).

In step 315, the computing device may determine whether the user has requested information for promotions (e.g., service offerings, product offerings, discounts, opening new accounts). The computing device may generate a display that prompts the user to indicate whether the computing device should include information on one or more promotions on the transaction receipt. The computing device may generate the prompt, for instance, in response to the transaction request and/or after the requested transaction has been completed. If the user indicates that the user is not interested in promotions (step 315: N), the computing device may display and/or print a receipt for the transaction. The receipt may include, among other information, information identifying the user, the financial institution, the date, and/or the requested transaction (e.g., an amount deposited, an amount withdrawn, user accounts involved in the transaction, other information related to the transaction). Instead of prompting the user to indicate whether the user is interested in receiving promotions in step 315, the user may have previously indicated a preference to receive or not to receive promotions (e.g., by opting in or opting out of promotions via the user's profile and/or online account with the financial institution). If the user has not previously indicated a preference, the user may automatically be signed up to receive promotions. The computing device, in step 315, may retrieve the user's preference information to determine whether to include information on one or more promotions on the transaction receipt. In some aspects, promotions may be provided without requesting user input or retrieving preference information at step 315. Thus, the process may move from step 310 to step 320, without necessarily implementing step 315.

If the user indicates that the user is interested in promotions (step 315: Y), the computing device (or a central server, such as server 204) may determine, at step 320, which promotions to offer the user. Promotions may include, for example, internal promotions (e.g., an offer for a credit card with the financial institution), external promotions (e.g., a coupon for a gas discount), and/or a combination of internal and external promotions (e.g., an offer for discounts on third party products if the user uses the financial institution's debit or credit card at the third party vendor). Other examples of internal promotions include, for example, signing up for a new account (e.g., checking account, savings account, credit account) with the financial institution, signing up for a service offered by the financial institution (e.g., services of a financial advisor, text services), and speaking with a financial institution representative about various services and/or products. Other examples of external promotions include, for example, other coupons and advertisements from affiliates of the financial institution, such as third party affiliates (e.g., other financial institutions, financial services, non-financial service and/or product providers, such as restaurants, stores). For both internal and external promotions, the promotion may invite the user to request a call back from the financial institution or a third party to receive additional information on the promotion.

The promotions may be targeted and/or unique to the user and/or the transaction. For example, the computing device may retrieve information from a user profile associated with the user (which may be stored at server 204) that identifies, for instance, the user's likes or other preferences, dislikes, purchase history, type(s) of financial accounts of the user. The user profile information may be automatically uploaded to the computing device during the transaction, such as when the user requests the transaction (e.g., step 305). For example, promotions may be based on the type of account that the user holds with the financial institution. A type A accountholder may be provided one or more service offerings J, K, and L, whereas a type B accountholder may be provided one or more service offerings M, N, and O. Promotions may additionally or alternatively be location-based. For example, the promotions offered to the user may include coupons to Grocery Z if there is a Grocery Z located near the user's home, workplace, or other location indicated by the user's profile. Promotions may also be based on the location of the self-service device/ banking center. For example, the computing device may identify promotions for retailers geographically near the computing device (e.g., an ATM), such as restaurants within a one mile radius of the computing device. As another example, the location used to make the determination of which promotions to offer may be the location of the user's mobile device during the transaction.

Promotions may also depend on time information. For example, if the transaction occurs during meal times (e.g., 7 AM breakfast, 12 PM lunch, and/or 7 PM dinner times), promotions for nearby food establishments may be provided. Promotions may also depend on date information. For example, if the transaction occurs near a pay day, holiday, and/or tax refund date, promotions for retailers (e.g., clothing retailers) and/or other product/service providers may be provided. In some aspects, the computing device may automatically generate promotions for the user without requiring user input (e.g., step 315 may be optional, as previously discussed).

In step 325, the computing device may generate an offer code based on one or more promotions identified in step 320. The offer code may facilitate access to the promotion. For example, the offer code may be a one-dimensional barcode or a two-dimensional (2D) barcode, such as a Quick Response (QR) code. A 2D barcode, for example, may include various patterns used to store position information, alignment information, encoded data information, and other information. The encoded data information may include encoded alphanumeric text (e.g., a unique token that can be decoded by a financial institution server, such as server 204) and/or images, a URL to a website or other networked document, text to perform various commands, such as creating and/or sending a message (e.g., text message, email message), and/or various other information.

The offer code may be or otherwise include a one-time code unique to the user and/or transaction. As previously discussed, the computing device may factor in the user's profile, information about the transaction, and/or location information to generate the code. The computing device may generate a 2D barcode on-demand, such as in response to the user initiating the transaction, sometime during the transaction, after the transaction is completed, or after the user indicates an interest to receive promotions. The 2D barcode may include an identifier that identifies the requested transaction. For example, a check deposit on May 16, 2036 by customer A may be identified by transaction identifier CHDEP-51636-A. The computing device may encode CHDEP-51636-A on demand as a 2D or other type of barcode after the transaction has been identified and/or otherwise categorized. In addition to date information, the barcode may also encode the time of the transaction.

The 2D barcode may also identify the computing device (e.g., a self-service device) used to initiate and/or conduct the transaction and/or the location of the computing device. For example, the information encoded in the 2D barcode may be CHDEP-51636-A-LOCA if the ATM is located at location A or CHDEP-51636-A-ATM1 if the ATM's unique identifier is ATM 1. The barcode may include additional information unique to the user and/or transaction. By generating the 2D barcode on-demand in this manner, malicious use of the 2D barcode may potentially be prevented, since it may be difficult for a third party to predict a valid barcode combination, and since there would be no pre-printed barcodes, there would be no pre-printed barcodes to take without permission.

Alternatively or additionally, to potentially prevent misuse of the 2D barcode, the 2D barcode might not include transaction and/or customer information decodable by external computing systems (e.g., external to the financial institution). Instead, the 2D barcode might include information understandable by computing devices secured by the financial institution (e.g., at an ATM location, banking center location, or other secure server location). For example, the computing device may encode the 2D barcode with a randomly-generated or user-generated identifier, such as ABCD4321. The computing device may provide the randomly-generated identifier to a financial institution database (e.g., server 204), and the identifier may be tied to additional information related to the user and/or transaction (e.g., user account number, the type of transaction requested by the user, the time and date of the transaction, the ATM used to complete the transaction). Rather than being random, the identifier may be a value resulting from a hash function of other information encoded by the 2D barcode. Thus, as will be described in further detail in the examples that follow, a server 204 that receives a message from a user that scans the 2D barcode may read the identifier (e.g., ABCD4321) and retrieve, from a database, stored user and/or transaction information associated with that identifier. The 2D barcode generated by the ATM may also be secured by hashing and/or encryption techniques.

Once the 2D barcode has been used (e.g., scanned), additional uses of the 2D barcode might be prevented. For example, when a user device 203 retrieves or otherwise contacts a server 204 that manages the 2D barcodes, the server 204 may indicate (e.g., as a flag, counter, or other indicator), in the database storing the transaction and/or user information, that the transaction and/or user information has been accessed. Future accesses of the information, such as by the user device or another user device, may be prevented. For example, if another user device scans the 2D barcode and attempts to obtain the information stored in the database, access to the information may be denied because the information may have been flagged as previously accessed. Therefore, the user and/or transaction information may be protected by making the 2D barcode one-time use only.

The 2D barcode may also be used multiple times by the same user and/or device. For example, when a user device 203 retrieves or otherwise contacts a server 204 that manages the 2D barcodes, the server 204 may indicate, in the database storing the transaction and/or user information, a unique identifier for the user and/or device (e.g., an account number of the user, username of the user, IP address of the device, MAC address of the device, other user and/or device identifiers). Future accesses of the information may be restricted to the user and/or device associated with the stored unique identifier. For example, if another user device scans the 2D barcode and attempts to obtain the information stored in the database, access to the information may be denied because the IP address of the other user device does not match the stored IP address of the device that first contacted the server 204. Therefore, the user and/or transaction information may be protected by making the 2D barcode and/or information associated with the 2D barcode accessible to only one user.

Figure 8:
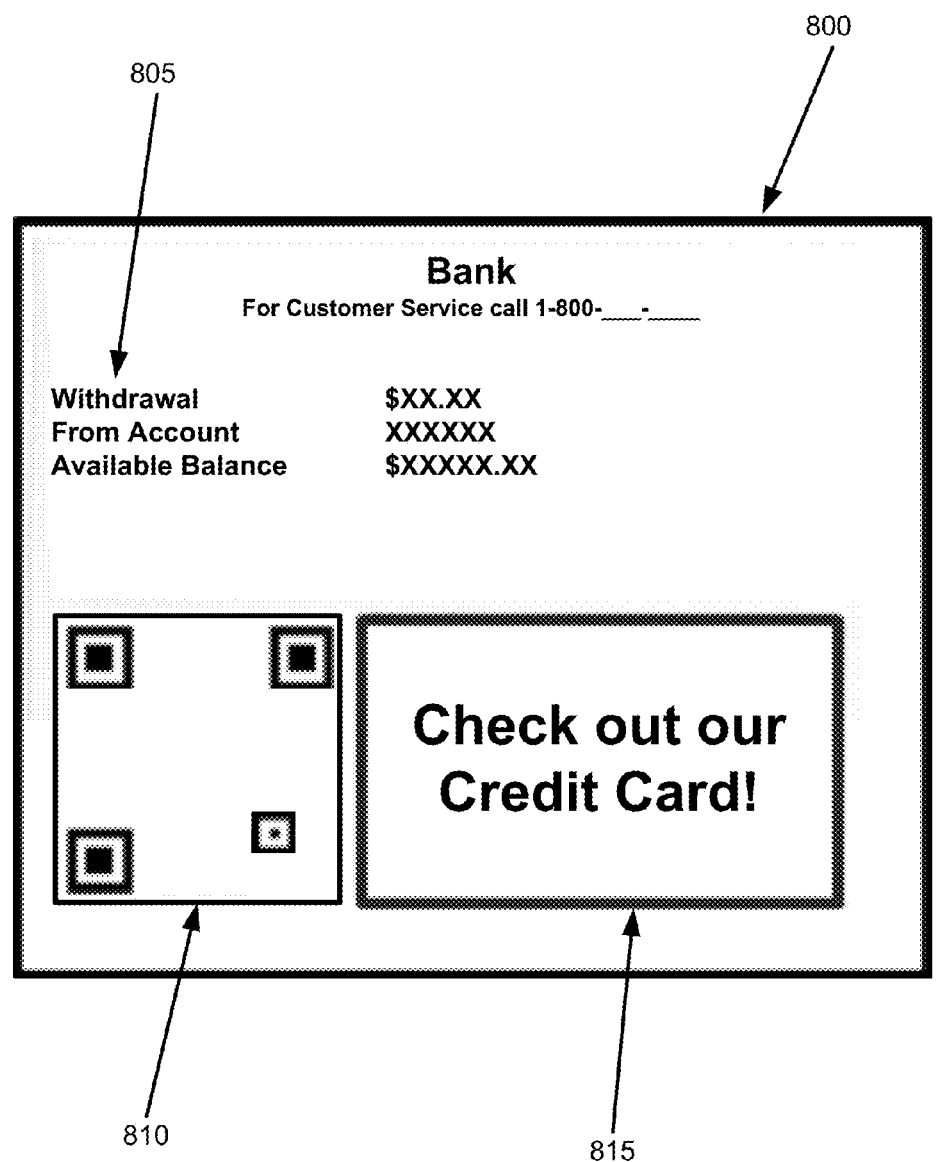
FIG. 8 illustrates an example of a receipt having an offer code in which various aspects of the disclosure may be implemented.

In step 330, the computing device may print the transaction receipt including the offer code, which in this example is a 2D barcode. FIG. 8 illustrates an example of a receipt 800 having an offer code in which various aspects of the disclosure may be implemented. The receipt may include transaction information 805. For example, if the user used an ATM to withdraw funds, the receipt printed by the ATM may indicate a withdrawal amount, the account that funds were withdrawn from, and an available balance in the account. The receipt may also include a printed 2D barcode 810 that encodes information uniquely identifying the transaction, such as in the manners described herein. The receipt may also include a message 815 indicating (e.g., summarizing) or otherwise relating to the contents of the 2D barcode. For example, if the 2D barcode is an offer to sign up for a credit card with the financial institution, message 815 may state "Check out our Credit Card!" As previously discussed, the receipt may alternatively or additionally be displayed on a display unit of the computing device, and the user may scan the 2D barcode directly from the display device.

In step 335, the computing device may store transaction information uniquely associated with the transaction in one or more secure databases, such as in the user's profile with the financial institution (e.g., at server 204). For example, information identifying the computing device (e.g., a self-service device) used to complete the transaction may be stored (e.g., an identifier of the self-service device, such as a network address (e.g., MAC address) or other identifier identifying the self-service device and/or location of the self-service device). The information may also identify the user (e.g., by an account number, username, card number, PIN, other unique identifiers). The information may identify the transaction. For example, the information may identify the type of transaction performed (e.g., a check deposit, funds transfer, account inquiry), the amount of funds involved in the transaction (e.g., $X,XXX check deposit), the length of the transaction (e.g., four minutes from transaction initiation to transaction completion). The information may also identify whether the user indicated an interest in receiving an offer code. The stored information may be identified by the randomly-generated identifier encoded in the 2D barcode. For example, the identifier may be included in a header field of the database (e.g., a file) storing the information.

While the offer code has been described in the context of a 2D barcode, other types of displayed and/or printed codes capable of storing information may be used instead of or in addition to the 2D barcode. A one-dimensional code, such as a linear barcode, or other two-dimensional codes may be used. Other unique images, such as a unique picture generated to represent the transaction, may be used. These images and codes may require image capturing devices (e.g., a mobile phone with an image capturing device) to decode. Other types of tags that don't require image capturing devices may also be used to store the transaction identifier. For example, near-field communication between the self-service device (e.g., an ATM) and a user device (e.g., the user's mobile device) may be used to transfer the transaction identifier from the self-service device to the user device. The self-service device may also generate radio-frequency identification (RFID) tags having the encoded transaction information and incorporate the RFID tags (e.g., via printing or attachment) onto the transaction receipt. A user device having a RFID reader may be used to read the information from the RFID tag.

Figure 4:
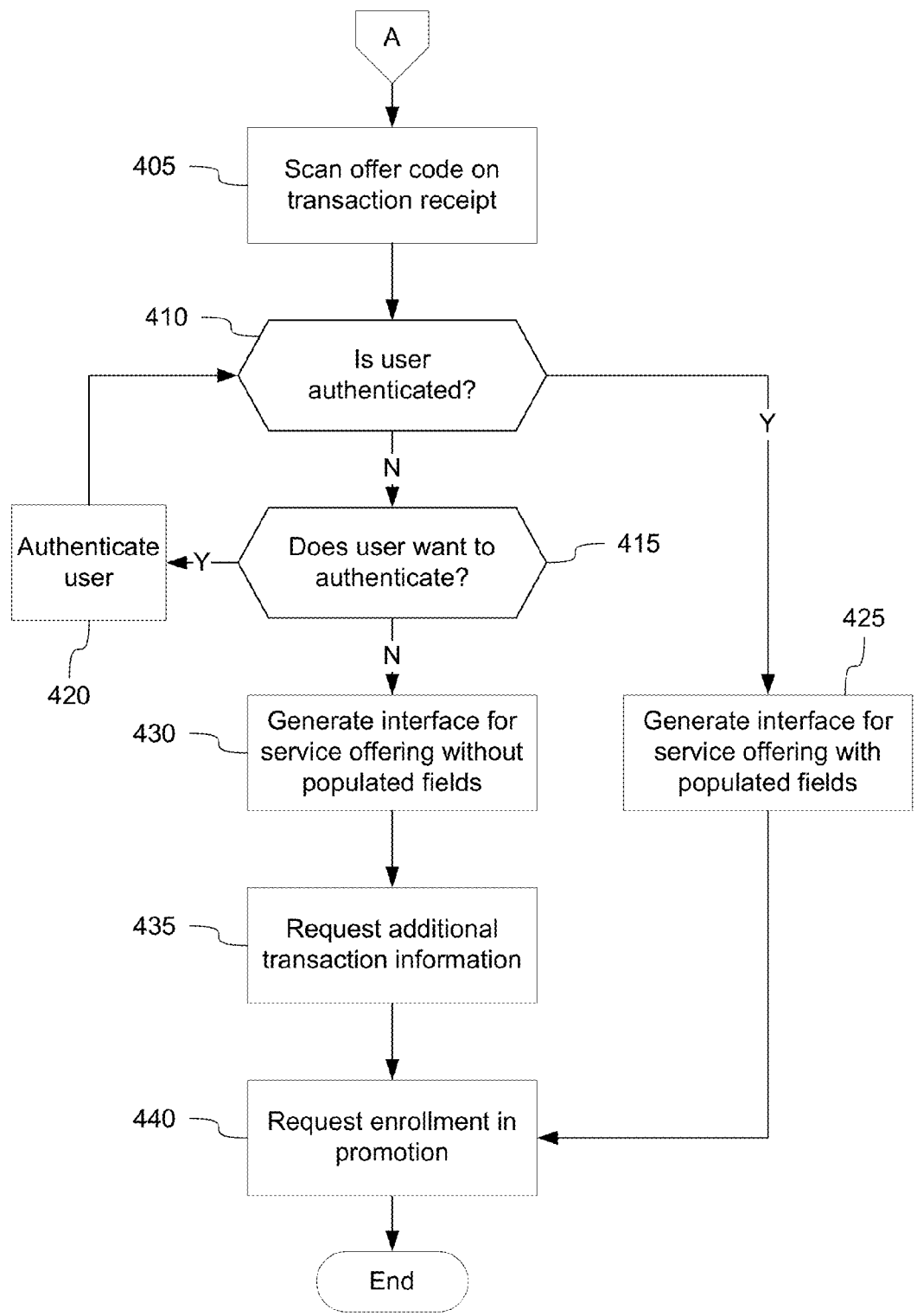
FIG. 4 illustrates an example of at least a portion of a flow diagram for processing an offer code in which various aspects of the disclosure may be implemented.

FIG. 4 illustrates an example of at least a portion of a flow diagram for processing an offer code in which various aspects of the disclosure may be implemented. The steps illustrated in FIG. 4 may be performed by a device, such as a user device 203. The user device may have a processor, memory storing computer-readable instructions to partially or fully perform at least some of the steps illustrated in FIG. 4, and other hardware and/or software components. For example, the user device may be a computing device such as the computing device 101 described in connection with FIG. 1. The user device may execute a software application (e.g., a mobile app) configured to decode the 2D barcode or other offer code and process the information included therein. In step 405, a user device may capture an image of (e.g., optically scan) the 2D barcode on the transaction receipt and/or displayed by the device performing the transaction (e.g., displayed by a self-service device, such as ATM). The user device may be any device having an image capturing device (e.g., a camera) that can capture an image of the 2D barcode. For example, the user device may be a mobile phone, tablet computer, personal computer, or other device associated with the user having one or more cameras (built-in or external). If the offer code generated by the ATM is a code that does not require direct line of sight to be detected, the user device may include various devices for reading those offer codes. For example, if the offer code is stored by an RFID tag in the self-service device or otherwise provided by a wireless transmitter of the self-service device, the user device may have a RFID reader capable of reading the wirelessly transmitted offer code. Similarly, if the self-service device utilizes near-field communication (NFC) technology to transmit the offer code, the user device may have an NFC transmitter and/or receiver for communicating with the self-service device and receiving the wirelessly transmitted offer code.

In step 410, the user device 203 (and/or server 204) may determine whether the user is authenticated (e.g., authenticated to utilize the offer code). This determination may be made in response to the user device scanning or otherwise reading the offer code. Alternatively, user authentication may occur before the offer code is scanned or otherwise read. For example, the user may authenticate by signing onto the user's account with the financial institution, by providing a user identifier (e.g., username, account number, PIN), by providing a password, and/or via biometric authentication. The user device 203 and/or server 204 may verify that the information provided by the user is true by comparing the provided information with information stored in the user's profile.

If the user is not authenticated (step 410: N), the user device, in step 415, may display a message to the user to determine whether the user would like to authenticate. The displayed message may indicate benefits of authenticating, such as the ability to pre-populate one or more data entry fields of the promotion. In step 420, if the user indicates an interest in authenticating (step 415: Y), the user device may authenticate the user by, for example, requesting a username and/or password from the user.

If the user is authenticated (step 410: Y), the user device may generate an interface for the promotion in step 425. The user device may pre-populate transaction and/or user information in the promotion interface. For example, the user device may decode the offer code to retrieve the randomly-generated identifier (or other identifier) uniquely identifying the transaction (e.g., ABCD4321). The user device may send the identifier (via a network, such as a cellular network or the Internet) to a computing device owned, operated, and/or managed by the user's financial institution (e.g., server 204). After authenticating the message from the user device, the server 204 may respond with transaction information previously stored by, for example, the self-service device (e.g., in step 335). This information may include the transaction type (e.g., check deposit, cash withdrawal), the amount of funds involved in the transaction (e.g., $20 withdrawn), the length of the transaction (e.g., four minutes), and/or whether the user indicated interest in receiving an offer code during the transaction. The server 204 may also respond with information identifying the user (e.g., name, phone number, address). The returned information may additionally or alternatively include information related to the promotion. For example, the server 204 may return information usable by the user device to generate a user interface for the promotion, including specific entry fields (e.g., user's name, address, phone number, email) for the promotion offer. If the promotion is for an account with a grocery store and grocery coupons, the server 204 may send, to the user device, a new grocery account number, digitally generated coupons, and information to generate an interface having the grocery store's brand image.

The user device may pre-populate one or more data fields (e.g., data entry fields) for the promotion with the returned information. For example, if the received grocery account interface includes an entry field for the user's assigned grocery account number, the user device may pre-populate the grocery account entry field with the grocery account number. In step 440, the user device may request enrollment in the promotion by transmitting the information included in the data entry fields. In some aspects, the user might not need to enter any additional information because the entry fields have been pre-populated with user and/or transaction information (if the user has been authenticated).

If the user is not authenticated, the user device, in step 430, may generate a user interface with one or more empty data entry fields for the promotion. The user interface may be retrieved based on the scanned offer code. For example, the user device may transmit the transaction identifier encoded in the 2D barcode to the server 204. The server 204 may return information for generating the user interface for the promotion, the interface including various data entry fields. In some examples, the server 204 might not return user information or transaction information because the user has not been authenticated. The user device may generate the interface on the user device and request the user to input user and/or transaction information in step 435. Thus, the user interface might not be pre-populated because the user has not been authenticated. When user and/or transaction information is received via user input, the user device may transmit the information for promotion enrollment in step 440.

In some aspects, the promotion may include a call back offer. A call back offer is an offer inviting the user to request a call back (e.g., phone call, text message, email, live chat) on the promotion (e.g., for further explanation of the promotion, to sign up for the promotion). The user may scan the offer code on the transaction receipt with the user's device (e.g., step 405). A graphical user interface may be displayed on the device, including an option to receive a call back from the financial institution or a third party product/service provider (e.g., step 425 and/or 430). Additional information may be requested from the user if the user is authenticated or unauthenticated (e.g., step 435 may be provided after both steps 425 and 430). For example, the user may indicate the user's availability, such as by selecting a time slot to receive a call back (e.g., Tuesday, between 4:00 PM and 4:30 PM) and/or indicate that the user is immediately available. The user may also confirm that the user's telephone number that will be called is accurate. In step 440, the user may request the call back appointment by transmitting the provided information and/or pressing a submit button on the user's device after confirming that the provided information is correct. The user may receive a call back from the financial institution and/or third party providing the promotions during the indicated time slot (if the user indicated a time slot) or immediately (if the user indicated that the user is immediately available and/or failed to indicate a time slot). If all of the service agents of the financial institution and/or third party providing the promotions performing the call backs are unavailable, an indication of the approximate wait time to connect to a service agent may be provided to the user (e.g., an automated voice service indicating an approximate wait time of 1 minute).

As previously described, user authentication may determine the type of information that an agent of a service provider (e.g., an automated computer agent or a physical employee of the financial institution or a third party providing promotions, such as a grocery store providing grocery coupons) may be provided. If the user is authenticated (step 410: Y), the agent of the service provider making the call may retrieve the user's information (and/or transaction information) from the financial institution's database as previously described. If the user is unauthenticated (step 410: N), the agent of the service provider might not be able to directly retrieve the user's information from the financial institution's database. Thus, the agent of the service provider may need to request additional information from the user during the call back in order to sign the user up for the promotion.

Figure 5:
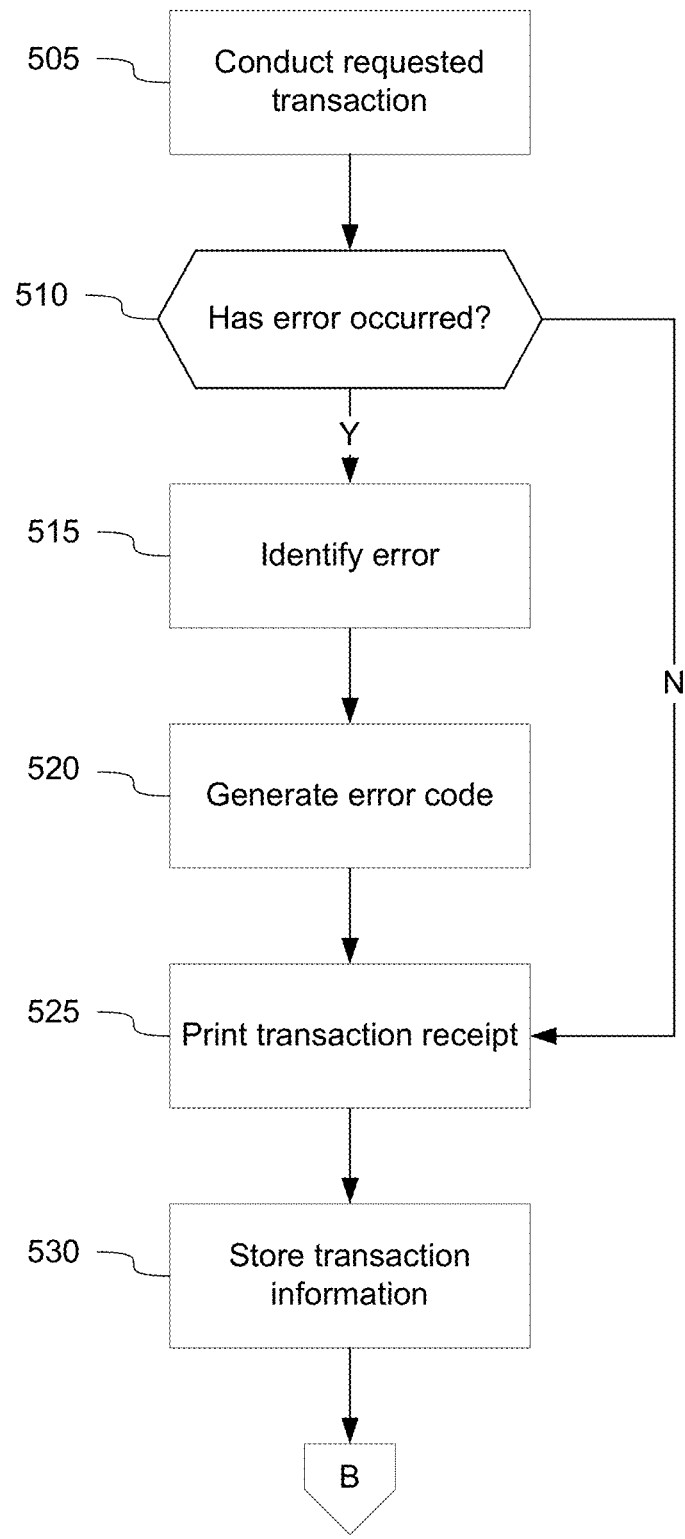
FIG. 5 illustrates an example of at least a portion of a flow diagram for generating an error code in which various aspects of the disclosure may be implemented.

FIG. 5 illustrates an example of at least a portion of a flow diagram for generating an error code in which various aspects of the disclosure may be implemented. The steps illustrated in FIG. 5 may be partially or fully performed by one or more computing devices, some or all of which may be owned, managed, and/or operated by a financial institution. The computing device may have a processor, memory storing computer-readable instructions to perform at least the steps illustrated in FIG. 5, and other hardware and/or software components. For example, the computing device may be, or may be part of, one of the self-service devices 201 or workstations 202. In step 505, a requested transaction may be conducted. As previously discussed, transactions may include financial transactions, such as fund deposits, fund withdrawals, check cashing, fund advances, funds transfers, payments, general account inquiries, cardless authentications, and/or account servicing.

In step 510, the computing device (e.g., a self-service device) may determine whether an error with the transaction has occurred. The computing device may determine that an error has occurred if the user indicates that an error has occurred, such as by pressing an "error" or "help" button on a touchscreen display or keypad of the computing device. In such a case, the error may be an error that the user has detected, but the computing device has failed to detect. In other cases, the computing device may itself detect the error without the need for user intervention. Each type of error may have an error identifier identifying the error type. The following table illustrates a set of example errors and corresponding error identifiers:

| Transaction Type | Error ID | Error Description |
| --- | --- | --- |
| Check deposit | Error 03 | Check taken without confirming deposit |
| Check cashing | Error 04 | Cash received does not match check amount |
| Cash Withdrawal | Error 12 | Cash received does not match amount requested |
| Update Account Info | Error 23 | Account information updated, but still incorrect |
| General Inquiry | Error 99 | Bank card not returned |

Figure 10A:
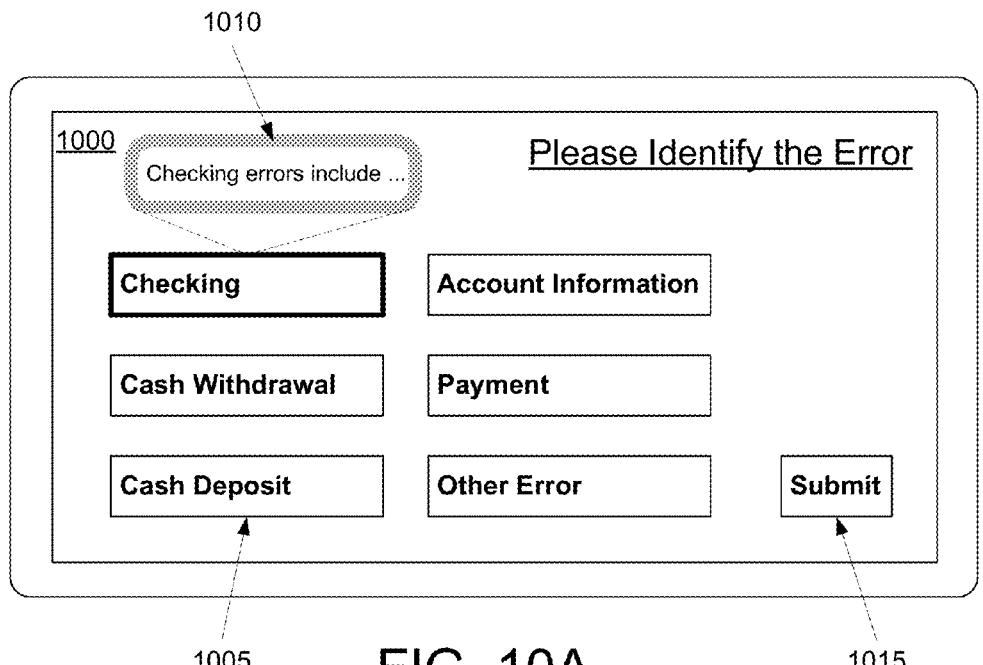
FIGS. 10A-B illustrate example transaction device interfaces in which various aspects of the disclosure may be implemented.
Figure 10B:
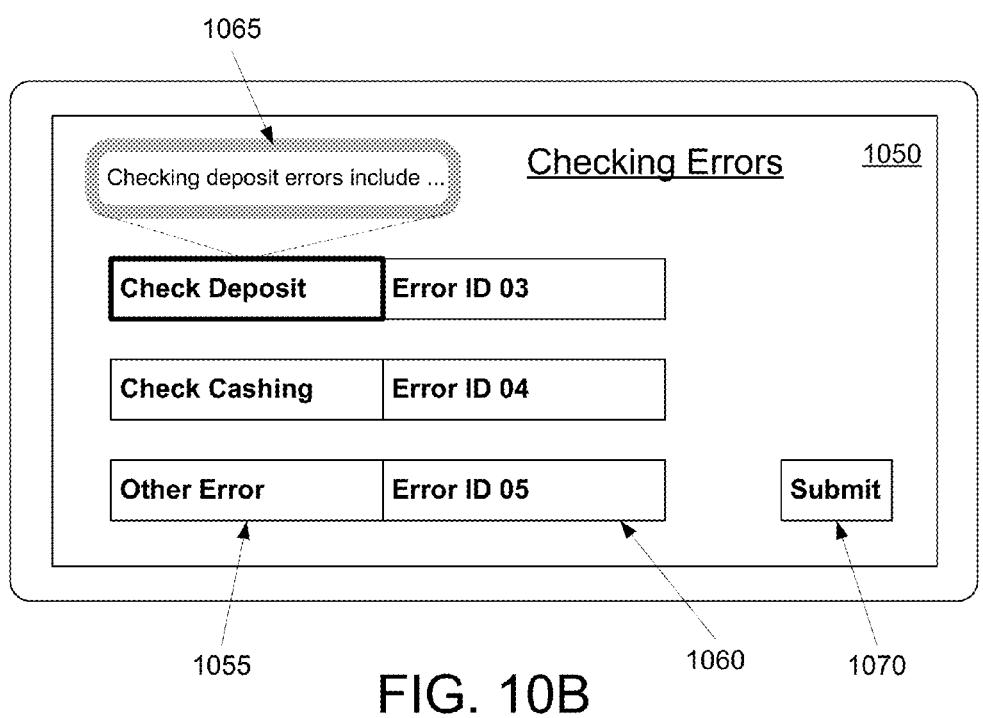

In step 515, the computing device may identify the error that occurred by requesting a description of the error from the user. For example, when the user presses the "error" button, the computing device may display an error identification interface 1000, as illustrated in FIG. 10A. The interface 1000 may display several categories of errors 1005, such as checking errors, cash withdrawal errors, cash deposit errors, account information errors, payments errors, and "other" errors. Each error category may be associated with a specific business unit or servicing agent within the financial institution. For example, the financial institution may have a checking business unit that handles checking transactions, including maintenance of checking accounts, check deposits, check distribution, checking errors, and other check-related inquiries. Furthermore, the checking business unit (or the checking error department within the checking business unit) may have a unique service telephone number, email address, or other contact information different from other business units. For example, the telephone number for the checking error department may be T-TTT-TTT-TTTT, whereas the telephone number for the cash withdrawal error department may be S-SSS-SSS-SSSS. Each error category 1005 may be associated with a unique business unit and have a unique service telephone number, email address, or other contact information assigned thereto.

The display device may provide additional information on each error category if the user presses or hovers over the button associated with the error category. For example, if the user presses the "Checking" error button, a pop-up text balloon 1010 may be displayed by the self-service device which describes the associated error category (e.g., "Checking errors include (1) the ATM accepting the check without confirming a corresponding deposit, (2) cash received from a cashed check does not match the check amount, . . . "). The user may press the submit button 1015 to select the error category matching the error.

The computing device may display another error display page 1050 in response to the user pressing the submit button 1015 with "checking" errors highlighted on display page 1000. Display page 1050 may display several types of checking errors 1055, such as check deposit errors, check cashing errors, and "other" errors. The display device may display a corresponding error identifier 1060 for each checking error type 1055. For example, error ID 03 may correspond to check deposit errors. The computing device may display more information 1065 on each error type if the user selects or hovers over one of the checking error buttons 1055. The user may press a submit button 1070 to select the appropriate checking error type. Each error category and type may have a similar display page 1000 and 1050 that permit the user to indicate the type of error that the user believes has occurred. Thus, each transaction error may be associated with a service telephone number and an error identifier.

In step 520, the computing device may generate an error code, such as a 2D barcode, for the identified transaction error. In step 525, the 2D barcode may be printed and/or otherwise included on the transaction receipt, and the transaction receipt may be printed and/or displayed to the user. The information included on the 2D barcode may uniquely identify the transaction and identified error. For example, as previously described, each error category may have an associated service telephone number (e.g., T-TTT-TTT-TTTT for checking errors). The 2D barcode may encode the service telephone number unique to the error category identified by the user. In some aspects, the 2D barcode may encode the error ID. For example, if a check deposit error occurred, the 2D barcode may encode T-TTT-TTT-TTTT for the service department that handles checking errors and Error ID 03 to identify that the specific error type was a check deposit error. The 2D barcode may also include a randomly-generated identifier (e.g., ABCD4321) that uniquely identifies the transaction.

Figure 9:
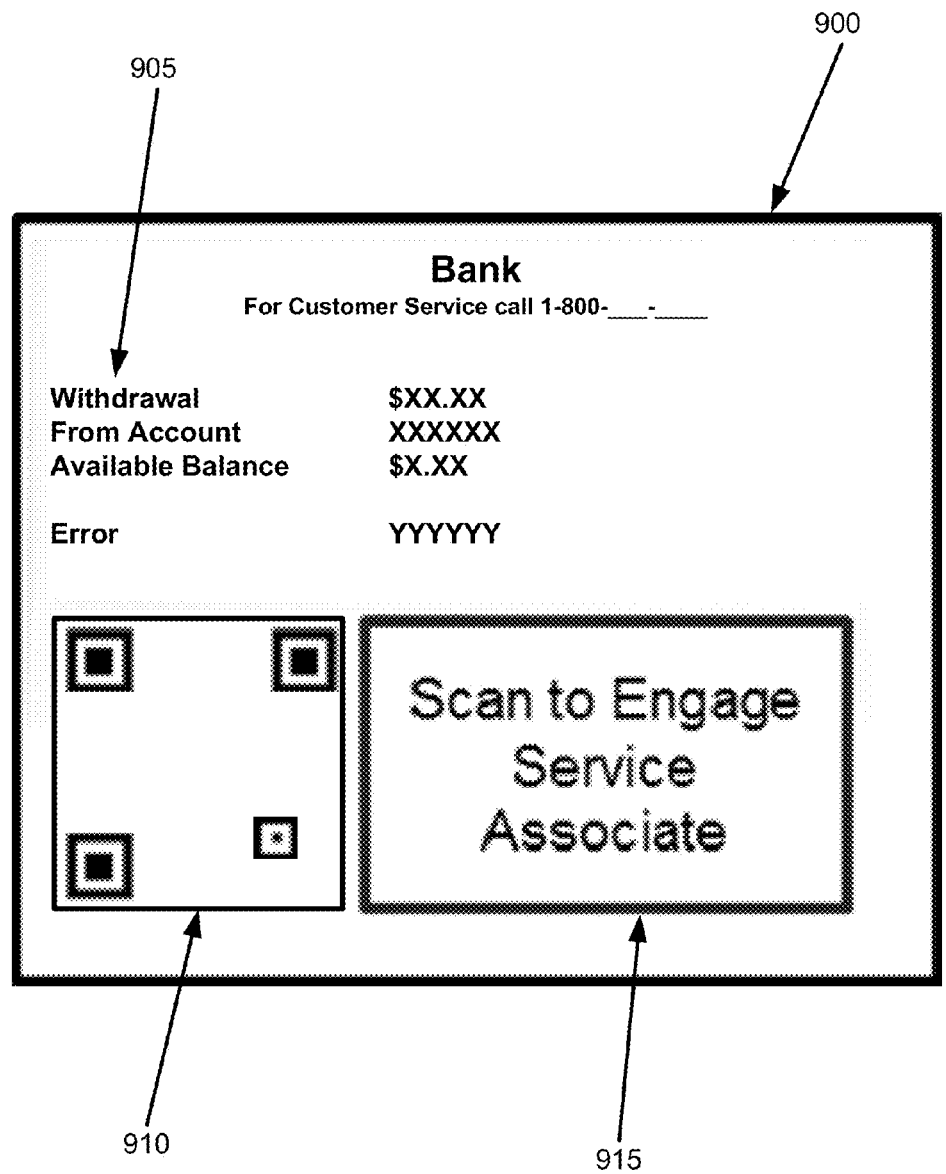
FIG. 9 illustrates an example of a receipt having an error code in which various aspects of the disclosure may be implemented.

FIG. 9 illustrates an example of a receipt 900 having an error code in which various aspects of the disclosure may be implemented. The receipt 900 may be printed to paper by the self-service device and/or displayed on the display device of the self-service device, and may include transaction information 905. The receipt may include a 2D barcode 910 or other error code that encodes information uniquely identifying the transaction between the user and the computing device, the error code, and/or the service telephone number. The receipt may also include a message 915 indicating (e.g., summarizing) or otherwise relating to the contents of the 2D barcode.

For example, if the 2D barcode indicates an error that occurred during the transaction, message 915 may state "Scan to Engage Service Associate." As previously discussed, the receipt may also be displayed on a display unit of the computing device, and the user may scan the 2D barcode directly from the display unit.

In step 530, the computing device may store information uniquely associated with the transaction in one or more secure databases, such as in the user's profile with the financial institution. For example, information identifying a self-service device used to conduct the transaction may be stored (e.g., the identifier of the self-service device, such as a network address (e.g., MAC and/or IP address), street address, self-service device name, or other identifier identifying the self-service device and/or location of the self-service device). The information may also identify the user (e.g., an account number, username, card number). The information may include other transaction information. For example, the information may identify the type of transaction requested (e.g., a check deposit, funds transfer, account inquiry), the amount of funds involved in the transaction (e.g., $205 check deposit), and the length of the transaction (e.g., four minutes from transaction initiation to transaction completion). The information may also identify the error ID. The stored information may be associated with the randomly-generated identifier of the 2D barcode. For example, the identifier may be included in a header file identifying the storage location of the information.

Figure 6:
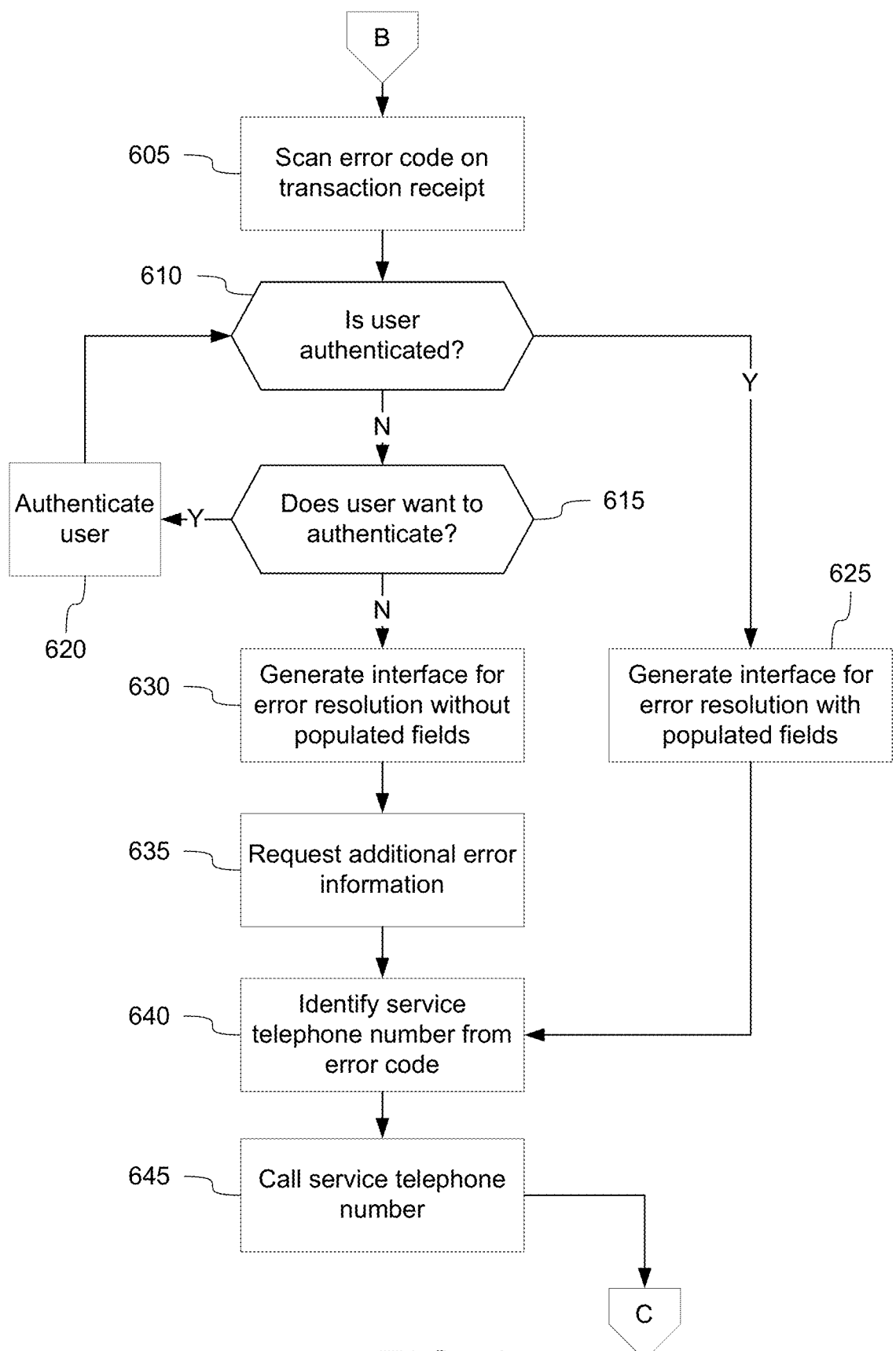
FIG. 6 illustrates an example of at least a portion of a flow diagram for processing an error code in which various aspects of the disclosure may be implemented.

FIG. 6 illustrates an example of at least a portion of a flow diagram for processing an error code in which various aspects of the disclosure may be implemented. Some or all of the steps illustrated in FIG. 6 may be partially or fully performed by a computing device, such as a user device 203. The user device may have a processor, memory storing computer-readable instructions to perform at least the steps illustrated in FIG. 6, and other hardware and/or software components, and may be configured such as the example computing device 101. For example, the user device may store a software application (e.g., a mobile app) configured to decode the 2D barcode or other error code and process the information included therein. In step 605, the user device may capture an image of the 2D barcode on the transaction receipt (e.g., by optical scanning). The user device may be any device having an image capturing device (e.g., a camera) that can capture an image of the 2D barcode. For example, the user device may be a mobile phone, tablet computer, personal computer, or other device having one or more cameras (built-in or external). If the error code generated by the ATM or other self-service device is a code that does not require direct line of sight, the user device may include various devices for reading those codes. For example, if the offer code is an RFID tag, the user device may have a RFID reader. Similarly, if the ATM utilizes NFC to transmit the transaction identifier, the user device may have NFC transmitters and/or receivers for communicating with the ATM.

In step 610, the user device 203 (and/or server 204) may determine whether the user is authenticated. This determination may be made in response to the user scanning the error code. Alternatively, user authentication may occur before the 2D barcode is scanned. For example, the user may authenticate by signing onto the user's account with the financial institution, by providing a user identifier (e.g., username, account number, PIN), by providing a password, and/or via biometric authentication. The user device 203 and/or server 204 may verify that the information provided by the user is true by comparing the provided information with information stored in the user's profile.

If the user is not authenticated (step 610: N), the user device, in step 615, may display a message to the user to determine whether the user would like to authenticate. The displayed message may indicate benefits of authenticating, such as the ability to pre-populate one or more data entry fields of the error transmission (e.g., a transmission, such as a call, email, or other two-way communication service to a financial institution servicing agent) if the user is authenticated. In step 620, if the user indicates an interest in authenticating (step 615: Y), the user device may authenticate the user by, for example, requesting a username and/or password from the user.

If the user is authenticated (step 610: Y), the user device may generate an interface for the error transmission in step 625. The user device may pre-populate transaction and/or user information in the interface. For example, the user device may decode the 2D barcode to retrieve the randomly-generated identifier uniquely identifying the transaction (e.g., ABCD4321), the error ID (e.g., Error ID 03), and/or the service telephone number (e.g., T-TTT-TTT-TTTT). The user device may send the error ID and/or transaction identifier (via a network, such as a cellular network or the Internet) to server 204 or another device owned, operated, and/or managed by the financial institution. In some aspects, the interface generated in step 625 may be optional. The user device may automatically call the service telephone number associated with the error category (e.g., using the service telephone number encoded in the 2D barcode) and transmit the transaction identifier and/or error ID to server 204 or another service agent associated with the service telephone number by authenticating (step 610: Y) and scanning the 2D barcode (step 605). Thus, in step 640, the user device may identify the service number T-TTT-TTT-TTTT from the scanned error code, and automatically call the service number in step 645.

If the user is not authenticated, the user device, in step 630, may generate a user interface with one or more empty data entry fields for the transaction error transmission. The user interface may be retrieved based on the scanned error code. For example, the user device may transmit the transaction identifier encoded in the 2D barcode to server 204. The server 204 may return information for generating the user interface for the error transmission, the interface including various data entry fields. The user device may display the interface on the user device and request the user for transaction information, such as an error ID (which may be printed on the transaction receipt) or to provide additional description of the error in step 635 (e.g., to input a textual description of the error, the location of the ATM, a call back phone number, other information related to the error). Thus, the user interface might not be pre-populated because the user has not been authenticated. In step 640, the user device may extract the service number T-TTT-TTT-TTTT from the scanned error code and call the service number in step 645. The server 204 and/or other service agent may be contacted via other means, such as an email, text message, online chat session, and/or other two-way communication services.

Figure 7:
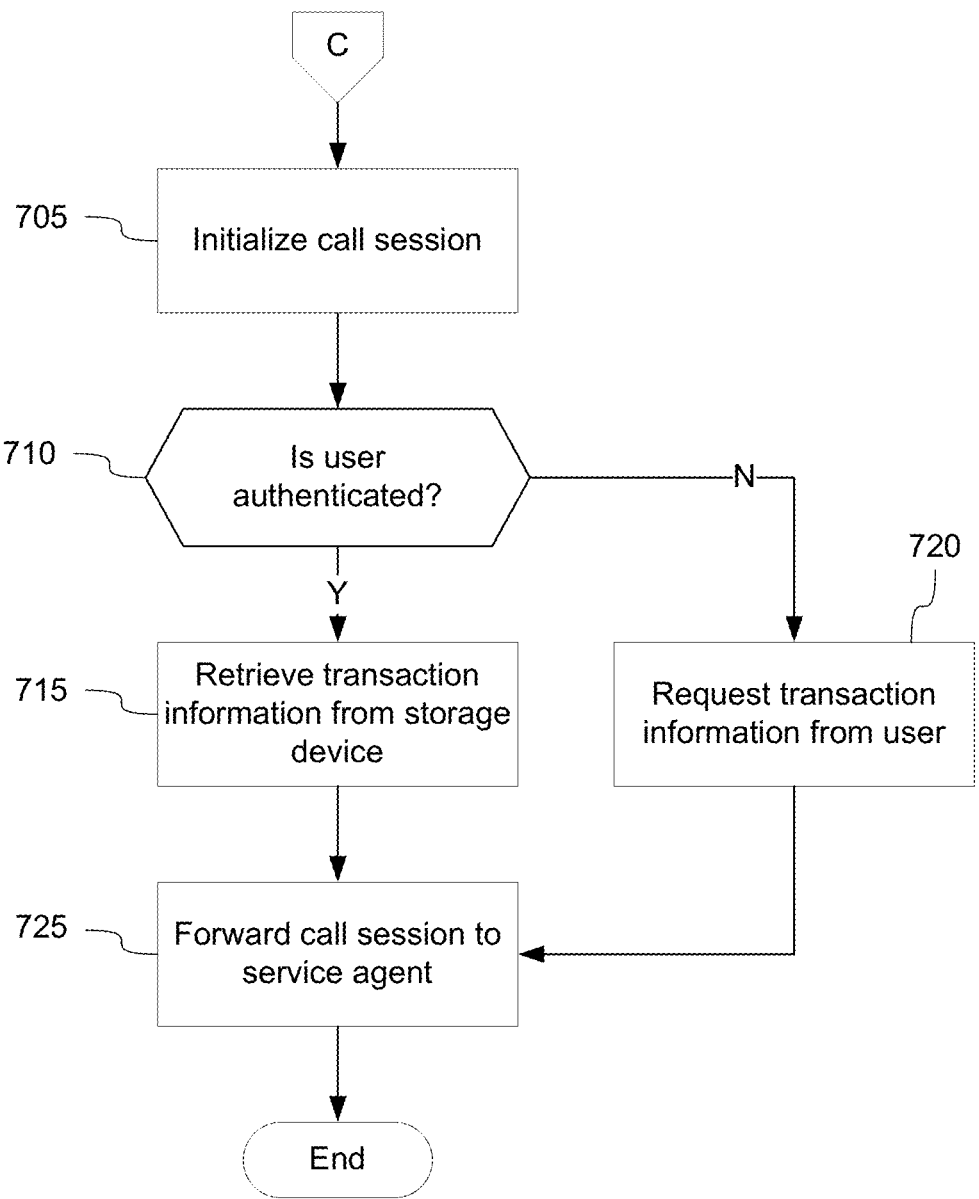
FIG. 7 illustrates an example of at least a portion of a flow diagram for resolving an error in which various aspects of the disclosure may be implemented.

FIG. 7 illustrates an example of at least a portion of a flow diagram for resolving an error in which various aspects of the disclosure may be implemented. Some or all of the steps illustrated in FIG. 7 may be partially or fully performed by a computing device that may be owned, managed, and/or operated by a financial institution, such as server 204. The computing device may have a processor, memory storing computer-readable instructions to perform at least the steps illustrated in FIG. 7, and other hardware and/or software components, and may be configured such as the computing device 101. In step 705, the computing device may initialize the call session with the user device. Initialization may include automatically receiving additional information from the user device, such as the transaction identifier, the error ID, the user device's phone number, an identifier identifying whether the user has been authenticated, and/or additional user information transmitted by the user device (e.g., account number, customer name, PIN).

In step 710, the computing device may determine whether the user requesting resolution of the error has been authenticated (e.g., authentication by the user device) based on the received information. If the user has been authenticated (step 710: Y), the computing device may retrieve additional information regarding the user and/or transaction in step 715. For example, the computing device may match the received transaction identifier (e.g., ABCD4321) with a transaction identifier stored in the user's profile in a financial institution database (e.g., in information storage step 530). The user's profile may include additional information on the transaction error. In some examples, the user device might not provide the error ID. Instead, the computing device may retrieve the error ID from the user's profile. The service agent may use the error ID to timely resolve the error because the error ID may describe the specific error that occurred (e.g., a check deposit error and not just a checking error). By storing the error ID in a secure location, such as a financial institution storage device, malicious use of the error ID may be prevented.

The computing device may retrieve, from the user's profile, additional information not provided in the 2D barcode. For example, the computing device may retrieve information identifying the time and date of the transaction or error and the self-service device that the error occurred at (e.g., ATM1). In the example of the check deposit error, the computing device may retrieve detailed information on the check deposit error transaction from the user's profile. The information may be used to detect the likelihood that the error occurred and/or otherwise be used to prevent malicious activities. For example, the computing device may determine the deposit amount that the user entered (e.g., via the display unit or a keypad of the computing device) when depositing the check. The computing device may compare the entered amount to the amount deposited into the account to determine whether they match. If they match, the computing device may determine that an error likely did not occur.

The check deposit transaction might not require the user to input the check amount. Instead, the self-service device might include an optical recognition device (e.g., a camera or other optical scanner with character recognition) that determines the amount written on the check (e.g., by scanning the check and recognizing characters on the check). The self-service device may store the determined amount in the user's profile, and the computing device may subsequently retrieve information identifying this amount from the user's profile. The computing device may similarly retrieve an image of the check (or a portion of the check, such as the portion of the check showing the amount of the check) scanned by the self-service device and perform its own character recognition to determine the check amount.

If the user has not been authenticated (step 710: N), the computing device may request additional information from the user in step 720. For example, the computing device may function as an automated phone system, prompting the user for various pieces of information. The computing device may prompt the user for the user's account number, card number, username, and/or a password, pin. If the received information corresponds to the user, the computing device may authenticate the user and retrieve the transaction information from the user's profile as previously described in step 715. The computing device may also prompt the user for basic information, such as the approximate time and date of the transaction and the location of the transaction. If the computing device is unable to authenticate the users from the received information, the computing device might not retrieve the transaction information from the user's profile.

In step 725, the computing device may forward the call session to a service agent identified by the service number (e.g., T-TTT-TTT-TTTT). The service agent may be a financial institution operator having a corresponding workstation 202. The computing device may additionally forward the information received in step 715 (authenticated user) or step 720 (unauthenticated user) to the service agent. The information may be displayed on a display device of the service agent's workstation for the service agent to use to resolve the error with the user. Thus, if the user is authenticated, the display device of the service agent's workstation may display detailed information on the transaction retrieved from the user's profile (e.g., an image of the check, the deposit amount entered by the user or identified by optical recognition software at the ATM, user profile information, such as an account number). On the other hand, if the user is not authenticated, the service agent might only receive, from the computing device, basic information from the user (e.g., the user's name, phone number, approximate time, date, and location of the transaction (as entered by the user)). The basic information might or might not include the error ID. For example, the error ID may be forwarded to the agent if the user provided the error ID during the automated call or the error ID was included on the 2D barcode. On the other hand, the error ID might not be forwarded to the agent if the user did not provide the error ID, and the error ID was not included on the 2D barcode. During the call with the unauthenticated user, the service agent may obtain additional information needed to resolve the error.

Reference is made back to FIG. 6. In some examples, instead of calling the service number (e.g., in step 645), the user may request a call back (or other form of communication, such as instant message chat) from the service agent. The user may scan the error code on the transaction receipt with the user's device (e.g., step 605). A graphical user interface may be displayed on the device, including an option to receive a call back from the service agent (e.g., step 625 and/or 630). Additional information may be requested from the user if the user is authenticated or unauthenticated (e.g., step 635 may be provided after both steps 625 and 630). For example, the user may indicate the user's availability, such as by selecting a time slot to receive a call back (e.g., Tuesday, between 4:00 PM and 4:30 PM) and/or indicate that the user is immediately available. The user may also confirm that the user's telephone number that will be called is accurate. In step 645, the user may request the call back appointment by transmitting the provided information and/or pressing a submit button on the user's device after confirming that the provided information is correct. The user may receive a call back from the service agent during the indicated time slot (if the user indicated a time slot) or immediately (if the user indicated that the user is immediately available and/or failed to indicate a time slot). If all of the service agents of the financial institution and/or third party providing the promotions performing the call backs are unavailable, an indication of the approximate wait time to connect to a service agent may be provided to the user (e.g., an automated voice service indicating an approximate wait time of 1 minute).

As previously described, user authentication may determine the type of information that is provided to the service agent during the call back. If the user is authenticated (step 610: Y), the service agent making the call may retrieve transaction information (e.g., information on the transaction and/or error and user information) from the financial institution's database. If the user is unauthenticated (step 610: N), the service provider might not be able to directly retrieve the user's information from the financial institution's database. Thus, the service provider may perform the call back, but may request additional information from the user during resolution of the error.

By handling errors away from the self-service device, the user may provide the service agent with confidential information (e.g., check deposit amount, account number) from a private location, instead of at the self-service device location, which may be public. The user is also provided with flexibility to handle the error at a time convenient to the user. Furthermore, excess delays or long lines at the self-service device may be prevented by routing the user away from the self-service device to handle errors.

A transaction receipt may include a plurality of promotion codes and/or error codes. In some aspects the promotion codes may be separate from the error codes. For example, a transaction receipt may include both a promotion code 810, as illustrated in FIG. 8, and an error code 910, as illustrated in FIG. 9. Alternatively, error and promotion codes may be combined into a single code. Information identifying the error and promotion may be provided on the single code and accessed when the user scans the code.

One-time use 2D barcodes may be used to track and/or analyze the number of 2D barcode uses. For example, each time a user scans a 2D barcode, a computing device (e.g., server 204) may indicate a success. The computing device may compare the number of code uses to the number of codes issued and/or generated (e.g., by an ATM) to determine the success rate (e.g., on average, three out of ten 2D barcodes are being used). The computing device may also determine the success rate of individual self-service devices. For example, each 2D barcode may indicate the ATM that generated the 2D barcode. When a user scans the code, the server 204 is provided with the indicator for the ATM that generated the used code. For third party promotions or other offerings via the 2D barcode, the financial institution may receive more funds from third parties that market at ATMs with higher 2D barcode usage rates (or gross numbers of use) than third parties that market at ATMs with lower 2D barcode usage rates. 2D barcodes may similarly be used to track the error rates at each self-service device. Thus, the 2D barcodes may be helpful in determining which self-service devices might or might not require servicing. For example, an ATM with a high error rate might require servicing, and an ATM with a low error rate might not require servicing.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving, at a computing device, a request for a transaction;
   after receiving the request for the transaction, generating, by the computing device, a 2D barcode code onto a transaction receipt, wherein the 2D barcode includes first information uniquely identifying the requested transaction;
   storing, at a storage device, second information uniquely identifying the requested transaction;
   determining, by the computing device, that an error of an error type has occurred during the requested transaction;
   receiving, at the computing device, an error identifier assigned to the error type, wherein the second information stored at the storage device includes the error identifier;
   receiving, from a user device, a call session request, wherein the call session request includes the first information;
   determining, based on the call session request, that a user associated with the user device is authenticated; and
   in response to determining that the user is authenticated, retrieving the second information.

2. The method of claim 1, wherein said generating the 2D barcode comprises printing the transaction receipt with the 2D barcode, wherein the transaction receipt identifies the requested transaction.

3. The method of claim 1, further comprising:
   forwarding the call session request and the second information to a service agent.

4. The method of claim 1, further comprising:
   receiving, from a user device, a request for a call back session, wherein the request for the call back session includes information identifying a time slot for the call back session; and
   providing the second information stored at the storage device to a service agent.

5. The method of claim 4, further comprising: during the time slot, initiating, by the service agent, a call to a user that requested the transaction.

6. The method of claim 1, wherein the 2D barcode is a Quick Response (QR) code.

7. The method of claim 1, wherein said generating the 2D barcode comprises printing the transaction receipt with the 2D barcode using a printer.

8. The method of claim 1, wherein the computing device comprises an automated teller machine (ATM).

9. The method of claim 8, wherein the user device comprises a mobile phone.

10. A method, comprising:
- receiving, at a computing device, a request for a transaction;
- after receiving the request for the transaction, generating, by the computing device, a 2D barcode code onto a transaction receipt, wherein the 2D barcode includes first information uniquely identifying the requested transaction;
- storing, at a storage device, second information uniquely identifying the requested transaction;
- determining, by the computing device, that an error of an error type has occurred during the requested transaction; and
- determining a service telephone number associated with the error type, wherein the first information included in the 2D barcode comprises the service telephone number.

11. The method of claim 10, wherein said generating the 2D barcode comprises printing the transaction receipt with the 2D barcode, wherein the transaction receipt identifies the requested transaction.

12. The method of claim 10, wherein the 2D barcode is a Quick Response (QR) code.

13. The method of claim 10, further comprising initiating a call, by the computing device, to the service telephone number.

14. The method of claim 10, wherein the computing device comprises an automated teller machine (ATM).

15. A method, comprising:
- receiving, at a computing device, a request for a transaction;
- after receiving the request for the transaction, generating, by the computing device, a 2D barcode code onto a transaction receipt, wherein the 2D barcode includes first information uniquely identifying the requested transaction;
- storing, at a storage device, second information uniquely identifying the requested transaction;
- determining, by the computing device, that an error has occurred during the requested transaction;
- generating, by a display device of the computing device, an error identification interface displaying a plurality of error categories; and
- receiving, from a user, an identification of at least one error category of the plurality of error categories.

16. The method of claim 15, wherein said generating the 2D barcode comprises printing the transaction receipt with the 2D barcode, wherein the transaction receipt identifies the requested transaction.

17. The method of claim 15, wherein the 2D barcode is a Quick Response (QR) code.

18. The method of claim 15, wherein the computing device comprises an automated teller machine (ATM).

* * * * *